United States Patent
Horan

(10) Patent No.: US 11,645,627 B2
(45) Date of Patent: May 9, 2023

(54) SYSTEMS AND METHODS FOR MACHINE LEARNING-INFORMED AUTOMATED RECORDING OF TIME ACTIVITIES WITH AN AUTOMATED ELECTRONIC TIME RECORDING SYSTEM OR SERVICE

(71) Applicant: HandPunch Guys LLC, Franklin Square, NY (US)

(72) Inventor: Will Horan, Franklin Square, NY (US)

(73) Assignee: HandPunch Guys LLC, Franklin Square, NY (US)

( * ) Notice: Subject to any disclaimer, the term of this patent is extended or adjusted under 35 U.S.C. 154(b) by 0 days.

(21) Appl. No.: 17/702,855

(22) Filed: Mar. 24, 2022

(65) Prior Publication Data

US 2022/0309471 A1 Sep. 29, 2022

Related U.S. Application Data

(60) Provisional application No. 63/220,276, filed on Jul. 9, 2021, provisional application No. 63/166,633, filed on Mar. 26, 2021.

(51) Int. Cl.
*G06Q 10/1091* (2023.01)
*G06V 10/82* (2022.01)
(Continued)

(52) U.S. Cl.
CPC ......... *G06Q 10/1091* (2013.01); *G06V 10/82* (2022.01); *G06V 40/107* (2022.01); *G06V 40/172* (2022.01)

(58) Field of Classification Search
CPC .. G06Q 10/1091; G06V 10/82; G06V 40/107; G06V 40/172
See application file for complete search history.

(56) References Cited

U.S. PATENT DOCUMENTS 10,839,203 B1  11/2020  Guigues et al.
11,030,442 B1 *  6/2021  Bergamo ............. G06V 10/454
(Continued)

FOREIGN PATENT DOCUMENTS

JP   2004220130 A  *  8/2004

OTHER PUBLICATIONS

Ganguly, Biswarup, Kinect Sensor Based Gesture Recognition for Surveillance Application, Dec. 22, 2018, arXiv (Year: 2018).*
(Continued)

*Primary Examiner* — Allen C Chein
*Assistant Examiner* — Aaron N Tutor
(74) *Attorney, Agent, or Firm* — Quintin Scheitlin; Padowithz Alce; Alce PLLC

(57) ABSTRACT

A system and method for a machine learning-based automated electronic time recording for personnel includes identifying, via a scene capturing device, a representation of a time recording space; identifying a body having a time recording pose within the time recording space based on an assessment of the representation of the time recording space; extracting a plurality of distinct features from the representation of the time recording space based on identifying the body having the time recording pose; executing automated user-recognition based on the extracting of the plurality of distinct features; executing automated time recording recognition based on the extracting of the plurality of distinct features; and executing automated electronic time recording, via a time recording application based on the automated user-recognition and the automated time recording recognition.

16 Claims, 3 Drawing Sheets

(51) Int. Cl.
*G06V 40/16* (2022.01)
*G06V 40/10* (2022.01)

(56) References Cited

U.S. PATENT DOCUMENTS

| | | | |
|---|---|---|---|
| 2006/0057550 A1* | 3/2006 | Sahashi | H04N 7/15 434/350 |
| 2019/0246075 A1 | 8/2019 | Khadloya et al. | |
| 2019/0341050 A1* | 11/2019 | Diamant | H04N 7/147 |
| 2021/0307621 A1* | 10/2021 | Svenson | A61B 5/02416 |

OTHER PUBLICATIONS

International Application No. PCT/US22/21629, International Search Report and Written Opinion dated Jul. 19, 2022, 21 pages.

* cited by examiner

SYSTEMS AND METHODS FOR MACHINE LEARNING-INFORMED AUTOMATED RECORDING OF TIME ACTIVITIES WITH AN AUTOMATED ELECTRONIC TIME RECORDING SYSTEM OR SERVICE

CROSS-REFERENCE TO RELATED APPLICATIONS

This application claims the benefit of U.S. Provisional Application No. 63/166,633, filed on 26 Mar. 2002, and U.S. Provisional Application No. 63/220,276, filed on 9 Jul. 2021, which are incorporated in their entireties by this reference.

TECHNICAL FIELD

This invention relates generally to the time recording and time tracking field, and more specifically, to a new and useful system and method for using machine learning to inform automated tracking and recording time.

BACKGROUND

Businesses can track the amount of time their employees/workers spend at work using time clocks. Time clocks generally range from mechanical clocks that require an employee to insert and punch a paper card to electronic time clocks that allow employees to swipe a magnetic identification card to register time. Businesses implementing these time clocks often experience employees waiting to perform a "time punch" as these time clocks are only equipped to register time for one employee at a time. Such limitations are especially burdensome when many employees are attempting to begin a shift or end a shift and thus, causing technical inefficiencies in electronically processing a volume of employees by the time clock computing systems.

Thus, there is a need in the automated employee time recording technical field to create improved systems and methods for an intelligent acceleration of time recording processes for a plurality of distinct time recording entities.

The embodiments of the present application described herein provide technical solutions that include implementing machine learning techniques that accelerate computational capabilities of a time recording system to simultaneously capture time recording actions performed by a plurality of distinct time recording entities within a given scene and further, address, at least the needs described above, as well as the deficiencies of the start of the art.

BRIEF SUMMARY OF THE INVENTION(S)

In some embodiments, a method for a machine learning-based automated electronic time recording for a plurality of employees includes identifying, via a scene capturing device, a representation of a time recording space located at a facility associated with an employer; identifying a plurality of distinct bodies having a time recording pose within the time recording space based on an assessment of the representation of the time recording space; extracting a plurality of distinct features from the representation of the time recording space based on identifying the plurality of distinct bodies having the time recording pose, wherein extracting the plurality of distinct features includes: (a) extracting a first distinct portion of a body for each of the plurality of distinct bodies within the representation of the time recording space; and (b) extracting a second distinct portion of the body for each of the plurality of distinct bodies within the representation of the time recording space; instantiating and executing a distinct automated employee-recognition for each of the plurality of distinct bodies based on extracting the first portion of the body for each of the plurality of distinct bodies, wherein executing the automated employee-recognition includes: (i-a) generating an employee-identification inference for each of the plurality of distinct bodies, by an employee-identification machine learning model, based on a model input comprising the first portion of the body; and (i-b) identifying, by one or more computers, an employee identifier value for each of the plurality of distinct bodies based on the user-identification inference; instantiating and executing a distinct automated time recording-recognition for each of the plurality of distinct bodies based on extracting the second distinct portion of the body for each of the plurality of distinct bodies; (ii-a) generating a time recording action inference for each of the plurality of distinct bodies, by a time recording machine learning model, based on a model input comprising the second portion of the body; (ii-b) identifying, by one or more computers, a time recording code of a plurality of distinct time recording codes for each of the plurality of distinct bodies based on the time recording action inference; and executing a plurality of distinct automated electronic time recording events, via a time recording application, for each of the plurality of distinct bodies based on inputs of (1) the employee identifier value and (2) the time recording code associated with each of the plurality of distinct bodies.

In some embodiments, the scene capturing device is an image capturing device configured to capture one or more representations of the time recording space. In some embodiments, at least one body of the plurality of bodies is determined to have the time recording pose in response to detecting that a hand of the at least one body is above a shoulder of the at least one body.

In some embodiments, extracting the first distinct portion of the body for each of the plurality of distinct bodies includes extracting at least a head from each of the plurality of distinct bodies; and extracting the second distinct portion of the body for each of the plurality of distinct bodies includes extracting at least a hand from each of the plurality of distinct bodies.

In some embodiments, the employee-identification machine learning model comprises a Convolutional Neural Network (CNN) that is trained based on one or more training corpora comprising a plurality of distinct portrait images of a plurality of distinct employees employed by the employer. In some embodiments, the time recording machine learning model comprises a Convolutional Neural Network (CNN) that is trained based on one or more training corpora comprising a plurality of distinct hand-based time recording gesture images.

In some embodiments, generating the employee-identification inference for each of the plurality of distinct bodies includes generating a facial feature vector for each of the plurality of distinct bodies. In some embodiments, the facial feature vector for each of the plurality of distinct bodies includes a plurality of distinct numerical values that correspond to a plurality of distinct facial features represented in the first portion of the body. In some embodiments, identifying the employee identifier value for each of the of the plurality of distinct bodies includes: matching the facial feature vector generated for each of the plurality of distinct bodies to a distinct reference facial feature vector of a plurality of distinct reference facial feature vectors based on matching criteria, wherein each distinct reference facial feature vector of the plurality of distinct reference facial feature vectors is digitally associated with a distinct employee identifier value that corresponds to a distinct employee of the employer; and digitally linking each of the plurality of distinct bodies to the distinct employee identifier associated with the distinct reference facial feature vector that matched to the facial feature vector generated for each of the plurality of distinct bodies.

In some embodiments, the employee identifier value identified for each of the plurality of distinct bodies is associated with a distinct user account managed by the time recording application. In some embodiments, before executing the plurality of distinct time recording events for each of the plurality distinct bodies, the distinct user account associated with each identified employee identifier value is in a first time recording state. In some embodiments, after executing the plurality of distinct time recording events for each of the plurality distinct bodies, the distinct user account associated with each identified employee identifier value is in a second time recording state, different from the first time recording state.

In some embodiments, generating the time recording action inference for each of the plurality of distinct bodies includes generating a hand pose estimation vector for each of the plurality of distinct bodies based on the model input comprising the second portion of the body. In some embodiments, the plurality of distinct time recording codes are digitally associated with a plurality of distinct hand pose target vectors. In some embodiments, identifying the time recording code for each of the plurality of distinct bodies based on the time recording action inference includes: matching the hand pose estimation vector generated for each of the plurality of distinct bodies to one of the plurality of distinct hand pose target vectors based on matching criteria; and digitally linking each of the plurality of distinct bodies to the time recording code associated with the one of the plurality of distinct hand pose target vectors that matched to the hand pose estimation vector generated for each of the plurality of distinct bodies.

In some embodiments, a method for a machine learning-based automated electronic time recording for a plurality of users includes identifying, via a scene capturing device, a representation of a time recording space in a physical environment; identifying a plurality of distinct bodies having a time recording pose within the time recording space based on an assessment of the representation of the time recording space; extracting a plurality of distinct features from the representation of the time recording space based on identifying the plurality of distinct bodies having the time recording pose, wherein extracting the plurality of distinct features includes: (a) extracting a first portion of a body for each of the plurality of distinct bodies within the representation of the time recording space; and (b) extracting a second portion of the body for each of the plurality of distinct bodies within the representation of the time recording space; instantiating and executing a distinct automated user-recognition for each of the plurality of distinct bodies, wherein executing the automated user-recognition includes: (i-a) generating a user-identification inference for each of the plurality of distinct bodies, by a user-identification machine learning model, based on a model input comprising the first portion of the body; and (i-b) identifying a user identifier value for each of the plurality of distinct bodies based on the user-identification inference; instantiating and executing a distinct automated time recording-recognition for each of the plurality of distinct bodies based on extracting the second distinct portion of the body for each of the plurality of distinct bodies, wherein executing the distinct automated time recording-recognition for each of the plurality of distinct bodies includes: (ii-a) generating a time recording action inference for each of the plurality of distinct bodies, by a time-recording machine learning model, based on a model input comprising the second portion of the body; and (ii-b) identifying, by one or more computers, a time recording code of a plurality of distinct time recording codes for each of the plurality of distinct bodies based on the time recording action inference; and executing a plurality of distinct automated electronic time recording events, via a time recording application, for each of the plurality of distinct bodies based on inputs of (1) the user identifier value and (2) the time recording code associated with each of the plurality of distinct bodies.

In some embodiments, the time recording code identified for a first body of the plurality of bodies is different from the time recording code identified for a second body of the plurality of bodies. In some embodiments, at least one of the plurality of distinct bodies is in a still position within or moving through the time recording space while directing attention towards the scene capturing device.

In some embodiments, the employee identifier value for each of the plurality of distinct bodies is identifiable when the plurality of distinct bodies have previously been associated with an automated electronic time recording system, and the employee identifier value for each of the plurality of distinct bodies is not identifiable when the plurality of distinct bodies have not previously been associated with an automated electronic time recording system. In some embodiments, the distinct automated user-recognition and the distinct automated time recording-recognition for each of the plurality of distinct bodies are simultaneously instantiated and executed.

In some embodiments, the time recording space includes a respective distinct body, different from the plurality of distinct bodies.

In some embodiments, the method includes identifying that the plurality of distinct bodies have the time recording pose within the time recording space and that the respective distinct body does not have the time recording pose within the time recording space. In some embodiments, after identifying that the plurality of distinct bodies have the time recoding pose and that the respective distinct body does not have the time recording pose: extracting the plurality of distinct features from the representation of the time recording space based on identifying the plurality of distinct bodies have the time recording pose; and forgoing extracting a plurality of distinct features from the representation of the time recording space corresponding to the respective distinct body based on identifying the respective distinct body does not have the time recording pose.

In some embodiments, a first distinct body of the plurality of distinct bodies comprises a first hand and a second hand. In some embodiments, the first distinct body is determined to be in the time recording pose when a respective hand of the first distinct body is detected above a pre-determined body part of the first distinct body. In some embodiments, extracting the second distinct portion for the first distinct body includes: in accordance with a determination that the first hand of the first distinct body is detected above the pre-determined body part, extracting the first hand of the first distinct body without extracting the second hand of the first distinct body; and in accordance with a determination that the second hand of the first distinct body is detected above the pre-determined body part, extracting the second distinct portion for the first distinct body includes extracting the second hand of the first distinct body without extracting the first hand of the first distinct body.

In some embodiments, the time recording space includes a plurality of time recording zones. In some embodiments, before executing the plurality of distinct automated electronic time recording events: the method includes identifying a location for each of the plurality of distinct bodies within the time recording space based on the assessment of the representation of the time recording space; determining a time recording zone from the plurality of time recording zones associated with each of the plurality of distinct bodies based on identifying the location for each of the plurality of distinct bodies; and after determining the time recording zone associated with each of the plurality of distinct bodies, executing the plurality of distinct automated electronic time recording events based on inputs of (1) the user identifier value, (2) the time recording code associated with each of the plurality of distinct bodies, and (3) the recording zone associated with each of the plurality of distinct bodies.

In some embodiments, after extracting the first portion or the second portion of the body for a first distinct body of the plurality of distinct bodies, the method includes identifying that the first portion or the second portion of the body for the first distinct body does not satisfy an image resolution threshold. In some embodiments, in response to identifying that the first portion or the second portion of the body for the first distinct body does not satisfy the image resolution threshold: the method includes forgoing instantiating and executing the distinct automated user-recognition for the first distinct body or forgoing instantiating and executing the distinct automated time recording-recognition for the first distinct body; includes forgoing executing the distinct automated electronic time recording event for the first distinct body; and includes providing at least a portion of the representation of the time recording space identified via the scene capturing device to a predetermined entity to assess a time recording intent of the first distinct body.

In some embodiments, a method for a machine learning-based automated electronic time recording for personnel includes at an automated electronic time recording system: identifying, via a scene capturing device, a representation of a time recording space in a physical environment; identifying a body having a time recording pose within the time recording space based on an assessment of the representation of the time recording space; extracting a plurality of distinct features from the representation of the time recording space based on identifying the body having the time recording pose, wherein extracting the plurality of distinct features includes: (a) extracting a first distinct portion of the body within the representation of the time recording space; (b) extracting a second distinct portion of the body within the representation of the time recording space; executing automated user-recognition based on extracting the first portion of the body, wherein executing the automated user-recognition includes: (i-a) generating a user-identification inference, by a user-identification machine learning model, based on a model input comprising the first portion of the body; (i-b) identifying a user identifier value based on the user-identification inference; and executing automated time recording-recognition based on extracting the second distinct portion of the body, wherein executing the automated time recording-recognition includes; (ii-a) generating a time-recording action inference, by a time-recording machine learning model, based on a model input comprising the second portion of the body; (ii-b) identifying, by one or more computers, a time recording code of a plurality of distinct time recording codes based on the time-recording action inference; and executing automated electronic time recording event, via a time recording application, based on inputs of (1) the user identifier value and (2) the time recording code.

DESCRIPTION OF THE PREFERRED EMBODIMENTS

The following description of the preferred embodiments of the inventions are not intended to limit the inventions to these preferred embodiments, but rather to enable any person skilled in the art to make and use these inventions.

1. System for Automated Electronic Time Recording

Figure 1:
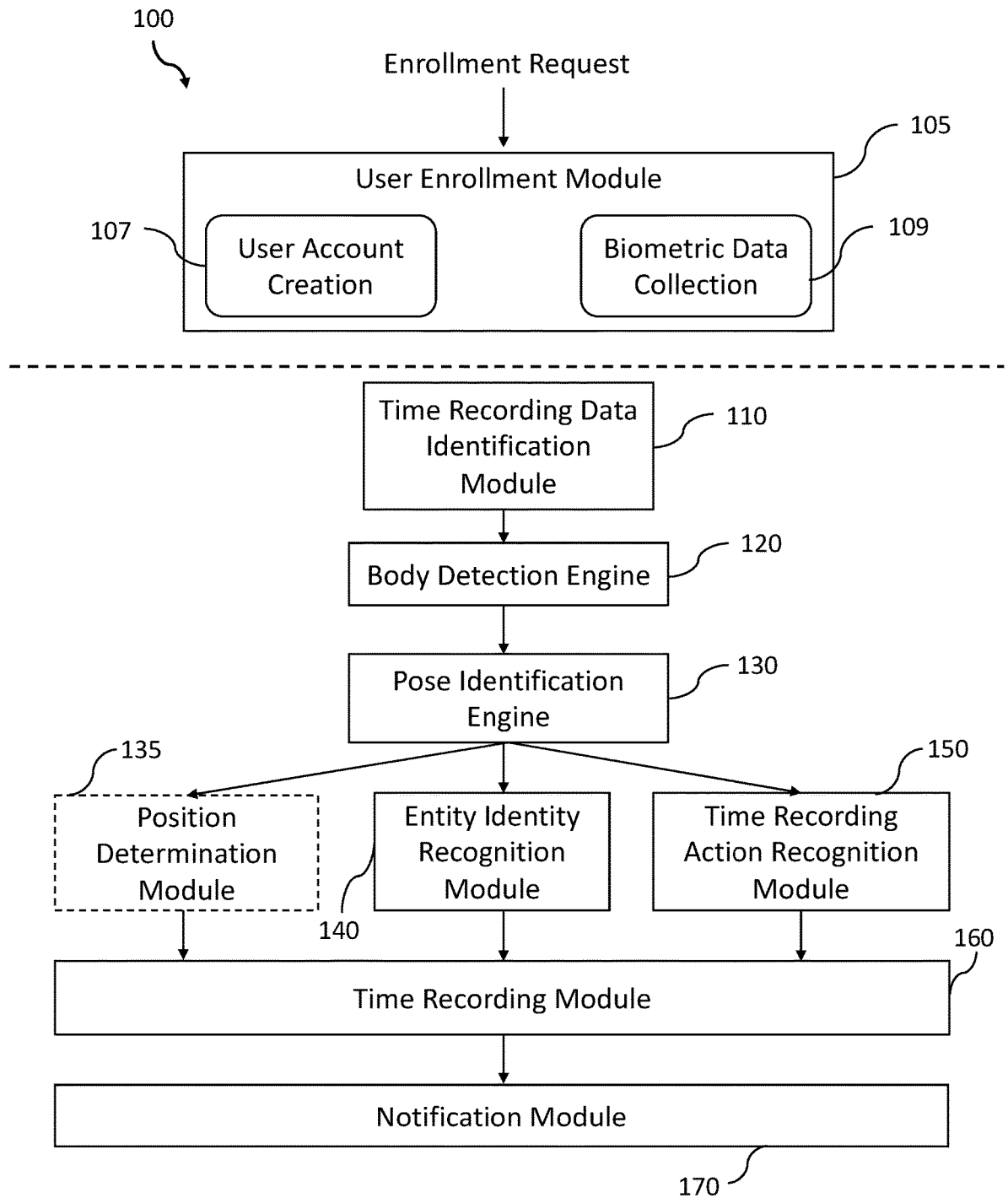
FIG. 1 illustrates a schematic representation of a system 100 in accordance with one or more embodiments of the present application.

As shown in FIG. 1, a system 100 for automated electronic time recording may include a user enrollment module 105, a time recording data identification module no, a body detection engine 120, an entity identification recognition module 140, a time recording action recognition module 150, a time recording module 160, and a notification module 170. In some embodiments, the user enrollment module 105, as shown in FIG. 1, may include a user account creation module 107 and a biometric data collection module 109. Additionally, as shown in FIG. 1, the system 100 may optionally include a position determination module 135.

1.05 User Enrollment Module

The user enrollment module 105 may function to receive a request to enroll a target user to the system 100 ("enrollment request"). The enrollment request received by the user enrollment module 105 may have been initiated/triggered by the target user or on behalf of the target user (e.g., via an administrator of the system 100). In some embodiments, in response to the user enrollment module 105 receiving the request to enroll the target user to the system 100, the user enrollment module 105 may execute the user account creation module 105 and/or the biometric data collection module 109, which will now be described.

It shall be noted that the user enrollment module 105 may function to receive a plurality of requests for enrolling a plurality of target users to the system 100, and in such cases, the user enrollment module 105 may function to process the plurality of requests sequentially or concurrently.

1.07 User Account Creation Module

The user account creation module 107 may function to create a user account for the target user. That is, the user account creation module 107 may function to create a user account for the target user associated with the enrollment request received by the user enrollment module 105. Creating the user account for the target user may include collecting information associated with the target user, such as a name of the target user, an address of the target user, a profile photo of the target user, and/or the like.

Creating the user account for the target user may also include creating or assigning a unique identifier to the target user. This unique identifier assigned to or created for the target user may be used, by the system 100, to delineate time recording activities performed by the target user from time recording activities performed by other users of the system 100. It shall be noted that after the user account creation module 107 creates a user account for the target user, the target user may then be able to interact with and/or access user interfaces provided by the system 100.

1.09 Biometric Data Collection Module

The biometric data collection module 109 may function to collect biometric data corresponding to the target user. The biometric data collected by the biometric data collection module 109 may include data used for constructing a facial signature of the target user, a vocal/voice signature of the target user, a gait (e.g., stride) signature of the target user, and/or the like.

In a preferred embodiment, the biometric data collection module 109 may be installed to an electronic device associated with the target user (e.g., a mobile application). In such embodiments, the biometric data collection module 109 may function to provide the target user with instructions for capturing the required biometric data and/or interface with one or more hardware components of the electronic device to capture the required biometric data of the target user.

Additionally, or alternatively, the biometric collection module 109 may be installed to one or more administrative systems and/or computing devices. In such embodiments, the biometric data collection module 109 (or similar enrollment module) may enable an administrator to collection biometric data of one or more users (e.g., employees and/or the like) of the system 100. In one or more embodiments, the biometric data collection module 109, as implemented for an administrator, may be in operable communication with one or more of a biometric data capturing device (e.g., cameras, bio scanners, and/or the like), a storage system, a time recording application (for creating a unique identifier), and/or the like.

1.10 Time Recording Data Identification Module

The time recording data identification module 110 may function to identify a time recording data stream. The time recording data stream identified by the time recording data identification module no may have been captured via one or more cameras of the system 100 and/or captured via one or more cameras in communication with the system 100. The one or more cameras of the system 100 or the one or more cameras in communication with the system 100 may be referred to herein as "scene capturing devices."

Preferably, the time recording data stream includes a plurality of frames or images that correspond to past, current, and/or recent activity occurring in a designated time recording space, such as a parking lot, hallway, room, or a factory floor of a facility. Accordingly, in such embodiments, one or more frames or images of the time recording data stream may include one or more representations of one or more bodies moving through the time recording scene with no intention of interacting with system 100, one or more representations of one or more stationary bodies performing time recording activities in the designated time recording space, and/or one or more representations of one or more bodies moving (e.g., walking, running, etc.) through the designated time recording space while performing a time recording activity.

It shall be noted that the time recording data stream identified by the time recording data identification module no may have been captured via other types of scene capturing devices, including, but not limited to, LIDAR sensors, infrared sensors, and/or thermographic sensors.

1.20 Body Detection Engine

The body detection engine 120 may function to receive the time recording data stream identified by the time recording data identification module no and detect if one or more bodies exist in the time recording data stream. To detect if one or more bodies exist in the received time recording data stream, the body detection engine 120 may preferably implement a body detection algorithm that includes human body edge detection capabilities.

In addition, or as an alternative, to the above-described body detection algorithm, the body detection engine 120 may implement any other suitable human body detection process or algorithm for identifying if one or more bodies exist within the received time recording data stream. It shall be noted that, in some cases, when the body detection engine 120 detects a plurality of bodies in the time recording data stream, the system 100 may function to instantiate and execute one or more of the modules 130-170 for each of the plurality of bodies such that time recording activities potentially performed by each of the plurality of bodies can be detected in parallel (as opposed to detected sequentially).

1.30 Pose Identification Engine

The pose identification engine 130 may function to identify a pose for one or more of the bodies identified in the time recording data stream. In some embodiments, to detect a pose for one or more of the bodies identified in the time recording data stream, the pose identification engine 130 may preferably implement a pose detection model. The pose detection model may function to receive an image of a respective body as input and, in turn, detect one or more body parts captured in the provided image of the respective body and/or determine a position or location of the one or more detected body parts (e.g., X, Y, and/or Z coordinates).

Based on the computed positions of one or more of the detected body parts, the pose identification engine may function to evaluate/determine if the respective body satisfies time recording pose criteria. It shall be noted that in addition, or as an alternative, to the pose detection model, the pose identification engine 130 may implement any other suitable pose detection process or algorithm for identifying a pose for the one or more of the bodies identified in the time recording data stream.

1.35 Position Determination Module

The pose determination module 135 may function to receive, from the pose identification engine 130, the positions/locations of one or more body parts of the target body. In turn, the position determination module 135 may compare the positions/locations of the one or more body parts of the target body to known time recording zones located in the time recording space to determine the time recording zone in which the target body may be located. It shall be noted that in addition, or as an alternative, to the above description the position determination module 135 may function to determine a position/location of a target body in the time recording space via any other body position detection model.

1.40 Entity Identity Recognition Module

The entity identity recognition module 140 may function to detect an identity for one or more of the bodies detected in the time recording data stream. In some embodiments, to detect an identity associated with one or more of the bodies detected in the time recording data stream, the entity identity recognition module 140 may preferably implement an identity detection model. The identity detection model may function to receive a portion of a respective body as input (e.g., the head of the body) and derive an identity associated with the respective body as output, such as a name corresponding to the respective body, an identification number associated with the respective body (e.g., as described with respect to the user enrollment module 105), contact information associated with the body, and/or the like.

Additionally, or alternatively, to the embodiment described above, S230 may function to compare the portion of the respective body (e.g., the head of the body) to a database that includes stored facial images of potential users and/or facial image features (e.g., eyes, nose, ears, lips, chin, etc.) of the potential users to derive an identity of associated with the respective body.

1.50 Time Recording Action Recognition Module

The time recording action recognition module 150 may function to detect or recognize a time recording action (or gesture) performed by one or more of the bodies detected in the time recording data stream. In some embodiments, to detect the time recording action performed by one or more of the bodies detected in the time recording data stream, the time recording action recognition module 150 may function to implement a time recording action recognition algorithm or model. The input provided to the time recording action recognition algorithm may correspond to a portion of a respective body (e.g., an image of a hand) and provide a name of the time recording activity performed by the respective body as output and/or provide a corresponding time recording code as output.

Time recording activities that may be detected by the time recording action recognition module 150 may include hand gestures for registering for work ("clock-in"), hand gestures for finishing work ("clock-out"), hand gestures for changing current labor task ("task change/transfer"), hand gestures for registering for a break ("break start"), hand gestures for ending the break ("break end"), hand gestures for registering for a meal ("lunch start"), hand gestures for ending the meal ("lunch end"), and/or the like.

Additionally, or alternatively, each of the body detection engine 120 (e.g., pixellib or the like), pose identification engine 130 (e.g., mediapipe or the like), pose determination module 135, entity identity recognition module 140, time recording action recognition module 150 (e.g., mobilenet or the like) may implement one or more ensembles of trained machine learning models. The one or more ensembles of machine learning models may employ any suitable machine learning including one or more of: supervised learning (e.g., using logistic regression, using back propagation neural networks, using random forests, decision trees, etc.), unsupervised learning (e.g., using an Apriori algorithm, using K-means clustering), semi-supervised learning, reinforcement learning (e.g., using a Q-learning algorithm, using temporal difference learning), adversarial learning, and any other suitable learning style. Each module of the plurality can implement any one or more of: a machine learning classifier, computer vision model, convolutional neural network (e.g., ResNet), visual transformer model (e.g., ViT), object detection model (e.g., R-CNN, YOLO, etc.), regression algorithm (e.g., ordinary least squares, logistic regression, stepwise regression, multivariate adaptive regression splines, locally estimated scatterplot smoothing, etc.), an instance-based method (e.g., k-nearest neighbor, learning vector quantization, self-organizing map, etc.), a semantic image segmentation model, an image instance segmentation model, a panoptic segmentation model, a keypoint detection model, a person segmentation model, an image captioning model, a 3D reconstruction model, a regularization method (e.g., ridge regression, least absolute shrinkage and selection operator, elastic net, etc.), a decision tree learning method (e.g., classification and regression tree, iterative dichotomiser 3, C4-5, chi-squared automatic interaction detection, decision stump, random forest, multivariate adaptive regression splines, gradient boosting machines, etc.), a Bayesian method (e.g., naïve Bayes, averaged one-dependence estimators, Bayesian belief network, etc.), a kernel method (e.g., a support vector machine, a radial basis function, a linear discriminate analysis, etc.), a clustering method (e.g., k-means clustering, density-based spatial clustering of applications with noise (DBSCAN), expectation maximization, etc.), a bidirectional encoder representation from transformers (BERT) for masked language model tasks and next sentence prediction tasks and the like, variations of BERT (i.e., ULMFiT, XLM UDify, MT-DNN, SpanBERT, RoBERTa, XLNet, ERNIE, KnowBERT, VideoBERT, ERNIE BERT-wwm, MobileBERT, TinyBERT, GPT, GPT-2, GPT-3, GPT-4 (and all subsequent iterations), ELMo, content2Vec, and the like), an associated rule learning algorithm (e.g., an Apriori algorithm, an Eclat algorithm, etc.), an artificial neural network model (e.g., a Perceptron method, a back-propagation method, a Hopfield network method, a self-organizing map method, a learning vector quantization method, etc.), a deep learning algorithm (e.g., a restricted Boltzmann machine, a deep belief network method, a convolution network method, a stacked autoencoder method, etc.), a dimensionality reduction method (e.g., principal component analysis, partial lest squares regression, Sammon mapping, multidimensional scaling, projection pursuit, etc.), an ensemble method (e.g., boosting, bootstrapped aggregation, AdaBoost, stacked generalization, gradient boosting machine method, random forest method, etc.), and any suitable form of machine learning algorithm. Each processing portion of the system 100 can additionally or alternatively leverage: a probabilistic module, heuristic module, deterministic module, or any other suitable module leveraging any other suitable computation method, machine learning method or combination thereof. However, any suitable machine learning approach can otherwise be incorporated in the system 100. Further, any suitable model (e.g., machine learning, non-machine learning, etc.) may be implemented in the various systems and/or methods described herein.

1.60 Time Recording Module

The time recording module 160 may function to record time recording activities performed by one or more of the bodies detected in the time recording data stream to a time recording database of the system 100 or to a time recording database in communication with the system 100. To record or register a time recording activity performed by a body in the time recording data stream, the time recording module 160 may function to receive, as input, the time recording zone in which the body may be located from the position determination module 135, receive the user/identity associated with the body from the entity identity recognition module 140, and/or receive the time recording action performed by the body from the time recording action recognition module 150.

In response to the time recording module 160 receiving the above-described data (inputs), the time recording module 160 may function to construct and record a time recording entry to the time recording database. The time recording entry may include information indicating that, at a particular time, the user associated with the detected body performed a particular time recording activity while located within a particular time recording zone. It shall be noted that a time recording zone may not be required to be specified in order to record time to the time recording database. Additionally, it shall also be noted that recording a time entry to the time recording database may cause a time recording state for the user associated with the time recording entry to be updated accordingly (e.g., change from being in a clocked-in state to being in a clocked-out state).

1.70 Notification Module

The notification module 170 may function to notify a target user when (or after) a time recording entry has been successfully registered for the target user. That is, in response to the time recording module 160 registering a time recording activity to a time recording database, the notification module 170 may function to display, via a display generation component of the system 100, a notification that indicates attributes or characteristics about the recently registered time recording activity. Additionally, or alternatively, the notification module 170 may function to transmit, to an electronic device associated with the target user, a notification that indicates attributes or characteristics about the recently registered time recording activity.

2. Method for Automated Electronic Time Recording

Figure 2:
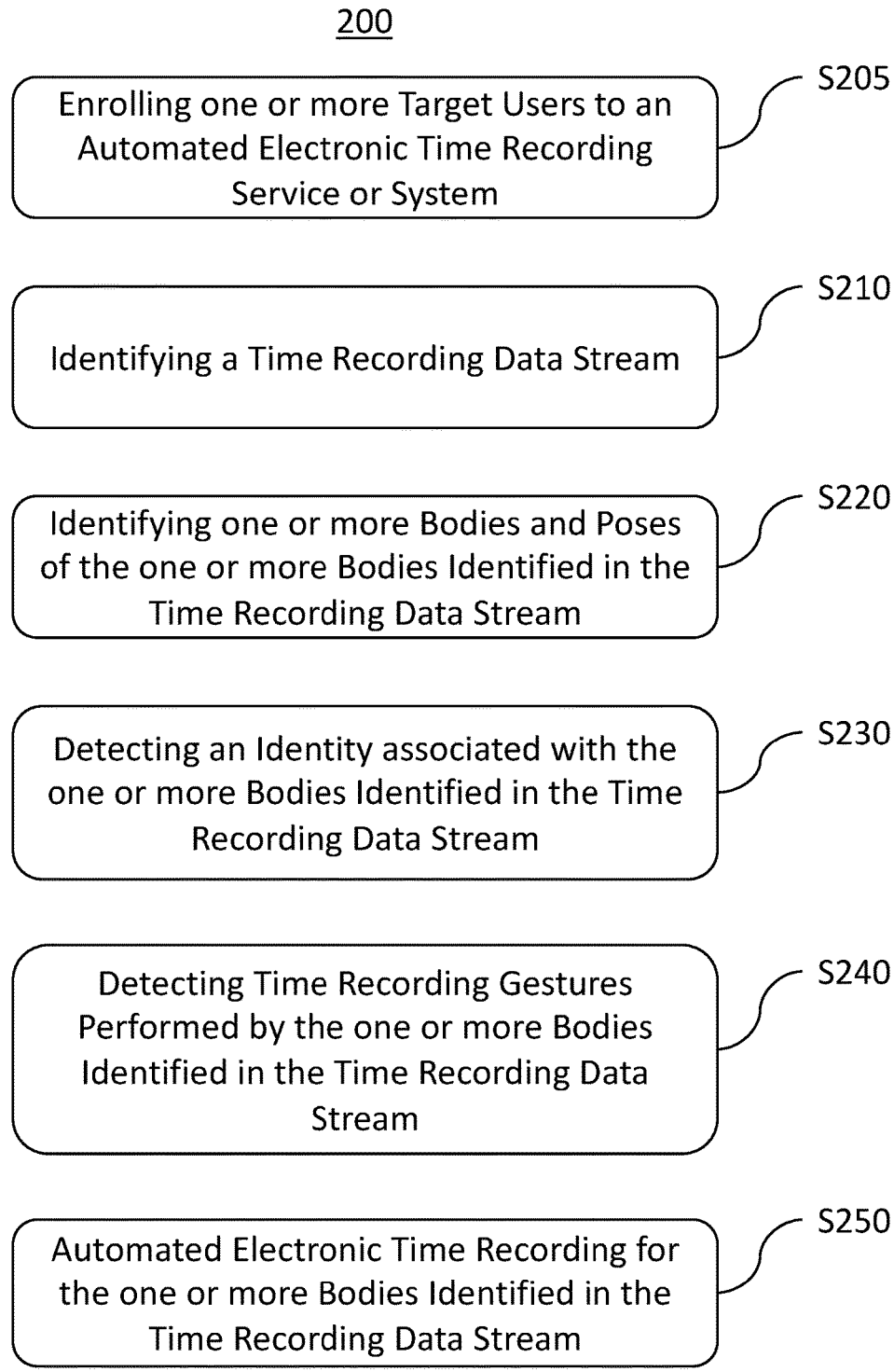
FIG. 2 illustrates an example method 200 in accordance with one or more embodiments of the present application.

As shown in FIG. 2, the method 200 for automated electronic time recording includes enrolling one or more target users to an automated electronic time recording system or service (S205), identifying a time recording data stream (S210), identifying one or more bodies and poses of the one or more bodies in the time recording data stream (S220), detecting an identity associated with the one or more bodies identified in the time recording data stream (S230), detecting time recording gestures performed by the one or more bodies identified in the time recording data stream (S240), and automated electronic time recording for the one or more bodies identified in the time recording data stream (S250).

2.05 User Enrollment 1 Biometric Data Collection

S205, which includes enrolling a target user, may function to enroll the target user to an automated electronic time recording system or service (e.g., system 100). Enrolling the target user to the automated electronic time recording service may include creating a user account for the target user and/or may include associating the created user account with biometric data corresponding to the target user. The user account created for the target user may enable the automated time recording service to receive time recording signals from the target user without requiring the target user to physically touch an input element of the automated electronic time recording service, as will be described in more detail herein.

Creating a User Account

In one or more embodiments, creating a user account for the target user includes creating or assigning a unique identifier (e.g., User ID) to the target user. The unique identifier assigned to or created for the target user may be used, by the automated electronic time recording service, to delineate time recording activities performed by the target user from time recording activities performed by other users of the automated time recording service, as will be described in more detail in S250. In a first implementation, the unique identifier of the target user may be automatically created or generated by the automated electronic time recording service (e.g., not influenced by user provided input). Alternatively, in a second implementation, S205 may assign a unique identifier to the target user based on a user provided unique identifier or an administrator provided unique identifier (e.g., use a provided email address as the unique identifier, an alphanumeric value, number, and/or the like).

Biometric Data

In one or more embodiments, S205 may also function to collect biometric data corresponding to the target user. The biometric data collected by S205 may include data used for constructing a facial signature of the target user, a vocal/voice signature of the target user, a gait (e.g., stride) signature of the target user, and/or the like. In a preferred embodiment, S205 may function to collect such biometric data via an (e.g., mobile) application provided by the automated electronic time recording service. In such embodiments, the application provided by the automated electronic time recording service may function to provide the target user with instructions for capturing the required biometric data (e.g., instructions for capturing one or more facial characteristics of the target user, one or more walking characteristics of the target user, one or more voice characteristics of the target user, and/or the like). Additionally, the application provided by the automated electronic time recording service may be installed on an electronic device associated with the target user and/or function to interface with one or more hardware components (e.g., a camera, microphone, biometric data-capturing device, fingerprint reader, and/or the like) of the electronic device to capture the required biometric data of the target user.

After collecting the biometric data corresponding to the target user, S205 may function to digitally associate or link the collected biometric data of the target user to the unique identifier assigned to/created for the target user (e.g., store biometric data and user identifier data in a suitable data structure, such as a data table, or the like). As will be described in more detail herein, digitally linking the biometric data of the target user to the unique identifier of the target user may enable the automated electronic time recording service to recognize, detect, and/or identify users interacting the automated electronic time recording service.

It shall be noted that while the above description describes examples of enrolling a single target user to the automated electronic time recording service, S205 may function to enroll a plurality of target users to the automated electronic time recording service in analogous ways described above.

2.10 Scene Identification

S210, which includes identifying a time recording data stream, may function to receive or capture a time recording data stream or one or more images or recordings of a scene that may include representations of one or more users enrolled in the automated electronic time recording service performing time recording gestures or actions. In some embodiments, the time recording data stream may additionally, or alternatively, include representations of one or more users that are not enrolled in the automated electronic time recording service and/or include representations of one or more users enrolled in the automated electronic time recording service that are not performing a respective time recording activity/gesture. It shall be noted that, for ease of description in some parts of the disclosure, a representation of a user in the time recording data stream may simply be referred to as "a user included in the time recording data stream."

Time recording gestures, as generally referred to herein, may be air gestures that users can physically perform to record time activities to the automated electronic time recording service, such as air gestures to register for work ("clock-in"), air gestures to finish work ("clock-out"), air gestures to change current labor task ("task change/transfer"), air gestures to register for a break ("break start"), air gestures to end the break ("break end"), air gestures to register for a meal ("lunch start"), air gestures to end the meal ("lunch end"), and/or the like. Additionally, or alternatively, time recording gestures may correspond to implicit or non-specific time recording activities (e.g., air gestures used to record a new time activity/action to the automated electronic time recording service without explicitly specifying the time activity/action type). Additional details relating to the time recording gestures will be described in further detail at S240.

In a preferred embodiment, the time recording data stream may be a video stream captured via one or more video cameras (e.g., one or more scene capturing devices). The one or more video cameras may be installed in a physical location/facility associated with one or more target users (employees) and/or may be wide field-of-view cameras capable of capturing or recording physical activity of the one or more target users (employees) within a designated time recording space or scene (e.g., one or more hallways, one or more rooms, one or more factory floors of a physical facility associated with an employer, and/or the like). Accordingly, in one or more embodiments, the time recording data stream captured via the one or more video cameras may include representations of a plurality of users (employees) moving through the time recording scene with no intention of interacting with the automated electronic time recording service, representations of a plurality of stationary users (employees) performing time recording gestures in the time recording scene, representations of a plurality of users (employees) moving through the time recording scene while performing time recording gestures, and/or the like.

In some embodiments, the time recording scene includes distinct time recording zones or areas. These distinct time recording zones may correspond to distinct tasks with which a performed time recording gesture may be associated. For instance, if a first user performs a first time-recording gesture while located within a first time recording zone, the first time recording gesture may be intended to correspond to a first job task. Conversely, if the first user performs the first time recording gesture while located within a second time recording zone, the first time recording gesture may be intended to correspond to a second job task (different than the first job task). Accordingly, in such embodiments, the time recording data stream may include representations of the time reporting zones/areas located within the time reporting scene such that the automated electronic time recording service may gauge time recording intent of the one or more users in the time reporting space/scene.

Alternatively, the time recording data stream may not be captured via one or more video cameras, but rather captured via any other scene capturing device capable of capturing activity of one or more users within the time reporting scene (e.g., LIDAR sensors or cameras, infrared sensors or cameras, thermographic sensors or cameras, and/or the like).

2.20 Body & Pose Detection|Time Recording Intent

Figure 3:
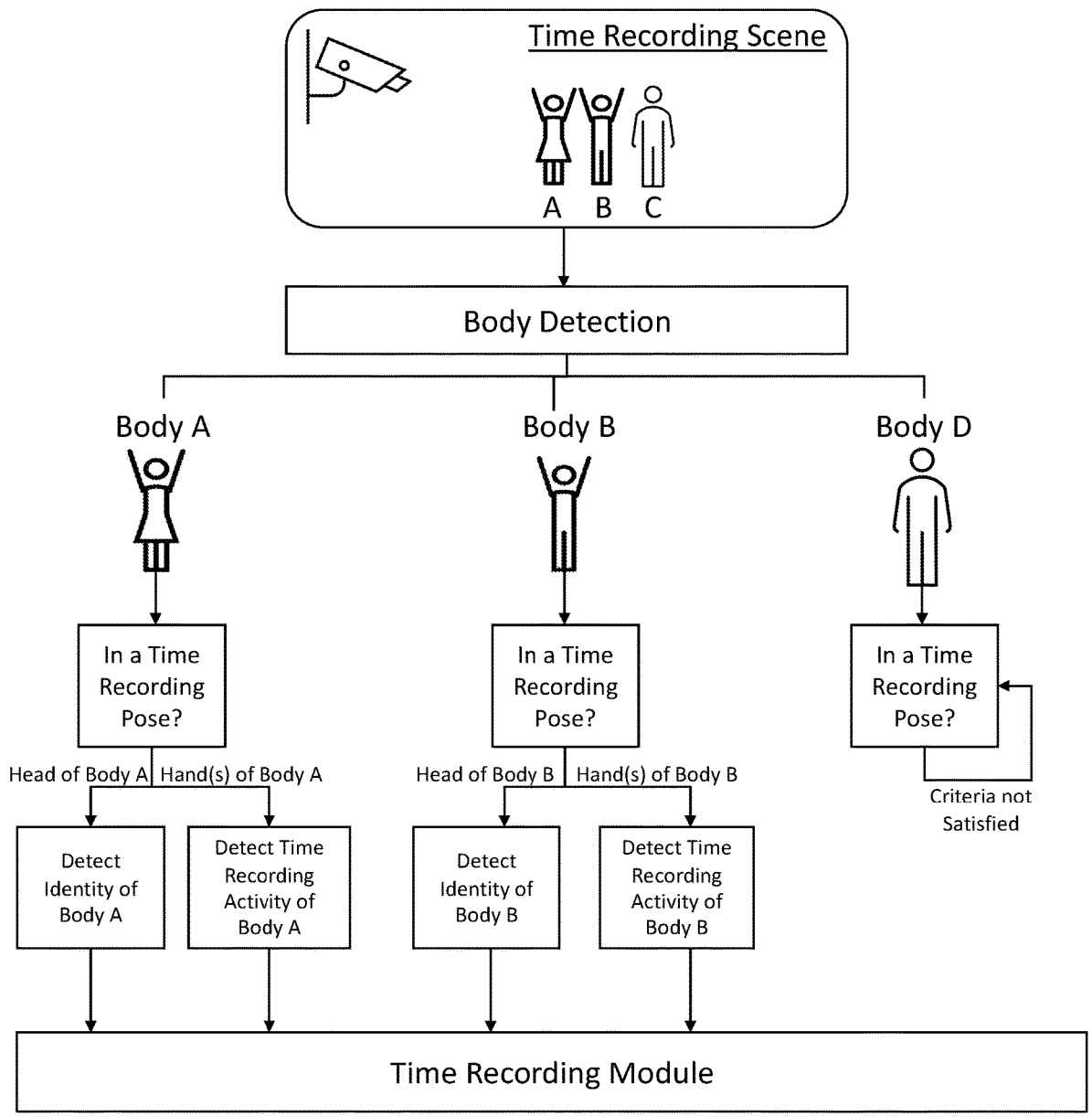
FIG. 3 illustrates an example schematic for evaluating time recording activities performed by a plurality of bodies identified in a time recording data stream in accordance with one or more embodiments of the present application.

S220, which includes detecting bodies and poses, may function to detect if one or more bodies exist in the time recording data stream identified by S210 and/or detect if the one or more bodies captured in the time recording data stream satisfy time recording pose criteria. Additionally, or alternatively, S220 may function to trigger concurrent or parallel time recording processes for the one or more bodies detected in the time recording data stream, as generally illustrated in FIG. 3.

Body Detection

In one or more embodiments, to determine if one or more bodies exist in the time recording data stream, S220 may function to implement a body detection algorithm/model. The body detection algorithm/model may function to identify human bodies existing in the time recording data stream and/or delineate the identified bodies from one another and/or other objects within a scene. In a preferred embodiment, to delineate the identified bodies in the time recording data stream from one another, the body detection model may apply a unique (e.g., color-coded) pixel mask to each identified body. Additionally, or alternatively, to delineate the distinct bodies identified in the time recording data stream from one another, the body detection model may individually encapsulate/bound each identified body (e.g., via distinct bounding boxes). It shall be noted that the body detection algorithm/model may also function to similarly identify/detect non-body related objects, which in turn, may eliminate false positive body detections in the time recording stream.

For instance, in a non-limiting example, the time recording data stream may include a plurality of frames (images) of the time recording scene. The body detection algorithm may receive a respective frame (e.g., representation) of the time recording data stream as input and produce a body-segmented image of the respective frame as output. If the time recording scene during the respective frame includes one or more bodies, the segmented image may uniquely mask or uniquely code each of the one or more bodies (e.g., a first body has a first pixel mask, a second body has a second pixel mask, etc.). Similarly, if the time recording scene during the respective frame includes one or more non-body objects (e.g., ceilings, walls, floors, furniture, and/or the like), the segmented image may generally, or uniquely, mask each of the one or more non-body objects as "non-body" objects. Other frames of the time recording data stream may be processed by the body detection model in a similar manner as described above and throughout the embodiments of the present application.

Pose Detection

In some embodiments, S220 may function to detect a pose for the one or more bodies identified in the time recording data stream. To detect a pose of a respective body in the time recording data stream, S220 may first function to generate or isolate an image of the respective body by extracting pixels from the time recording data stream corresponding to the respective body (e.g., the pixel mask corresponding to the respective body). Accordingly, the generated image of the respective body may only include a representation of that respective or singular body and may not include representations of other bodies and/or representations of non-body objects that may exist beyond a respective bounding box or respective outline of the target body. It shall be noted that, in cases in which the time recording data stream includes a plurality of bodies, S220 may function to concurrently generate and/or isolate images for the plurality of bodies (as opposed to generated sequentially in which one image of a body may be generated at a time).

Additionally, while or after generating images corresponding to the one or more bodies identified in the time recording data stream, S220 may also function to concurrently instantiate one or more instances of a pose detection model for each of the one or more bodies identified by the body detection model. Creating distinct instances of the pose detection model may allow poses of the one or more bodies in the time recording data stream to be computed in parallel (as opposed to computed sequentially in which poses of the one or more bodies may be determined one at a time). At least one technical benefit of such embodiment may be an accelerated detection and computation of bodies in a predetermined pose indicating a likely intent of a user to perform a time recording action or gesture. Thus, in such embodiments, a technical effect of accelerating a computing and/or detection by a computing system of whether a required pose and/or time recording gesture (as described below) has been achieved by entities in identified in a given scene. Further, in such embodiments, the technical effect of accelerated computing may be achieved based on the automatic instantiation of a plurality of distinct virtual machines or a plurality of distinct computing stages or pipelines that may be capable of ingesting input of data from each detected body in a proper propose and in a parallel manner process predicted pose data, identity-recognition data (e.g., facial recognition data), and/or time-recording gesture or posture data since each virtual machine or the like may be capable of instantiating the plurality of distinct modules used for pose identification, identity-recognition, and/or time-recording recognition.

The instantiated instances of the pose detection model may function to receive a generated image of a respective body as input and, in turn, detect one or more body parts captured in the provided image of the respective body (e.g., head, hands, feet, hips, shoulders, and/or elbows, etc.) and/or determine positions of the one or more body parts detected in the provided image of the respective body (e.g., X, Y, and/or Z coordinates corresponding to each detected body part). In other words, in cases where the time recording data stream includes a plurality of bodies, S220 may function to generate dedicated images corresponding to each of the plurality of bodies identified in the time recording data stream and provide those generated images to distinct instances of a pose detection model. The distinct instances of the pose detection model, in turn, may detect which body parts may be present in the provided image of a subject body and/or determine X (distance), Y (height), and/or Z (depth) coordinates of the body parts detected in the provided image of the subject body.

Time Recording Pose Criteria

In some embodiments, the computed X, Y, and/or Z coordinates for one or more body parts of a target body may be used, by S220, to assess whether the target body satisfies time recording pose criteria. In a first implementation, S220 may function to determine that the target body satisfies time recording pose criteria if a height (e.g., Y coordinate) of a first body part of the target body (e.g., hand) is above a height (e.g., Y coordinate) of at least a second body part of the target body (e.g., head and/or shoulders). Conversely, S220 may function to determine that the target body does not satisfy the time recording pose criteria if the height of the first body part of the target body is below the height of the second body part of the target body.

Additionally, or alternatively, in a second implementation, S220 may function to determine that the target body satisfies the time recording pose criteria if a distance between a third body part of the target body and a fourth body part of the target body (e.g., distance between an X-coordinate of the third body part and an X-coordinate of the fourth body part) is more than a threshold distance (e.g., 12 inches, 24 inches, 36 inches, etc.). Conversely, S220 may function to determine that the target body does not satisfy the time recording pose criteria if the distance between the third body part of the target body the fourth body part of the target body is not at least the threshold distance apart.

Additionally, or alternatively, in a third implementation, S220 may function to determine that the target body satisfies the time recording pose criteria if a first body part of the target body (e.g., hand) is above (or below) a second body part of the target body (e.g., shoulders) by at least a threshold amount (e.g., 12 inches, 24 inches, 36 inches, etc.). Conversely, S220 may function to determine that the target body does not satisfy the time recording pose criteria if the first body part of the target body (e.g., hand) is not above (or below) the second body part of the target body (e.g., shoulders) by at least the threshold amount (e.g., 12 inches, 24 inches, 36 inches, etc.).

It shall be recognized that the time recording pose criteria may be set in any suitable manner including, but not limited, criteria that set relative positioning requirements between distinct body parts of a target user for satisfying or defining a predetermined time recording pose.

In some embodiments, in cases where the time recording data stream includes a plurality of bodies, S220 may function to concurrently detect a pose for each of the plurality of bodies. Thus, in such embodiments, S220 may function to concurrently detect that a subset of the bodies in the time recording data stream satisfy the time recording pose criteria, that a subset of the bodies in the time recording data stream do satisfy the time recording pose criteria, that none the bodies in the time recording data stream satisfy the time recording pose criteria, and/or that all the bodies in the time recording data stream satisfy the time recording pose criteria.

When a respective body identified in the time recording data stream satisfies the time recording pose criteria, the automated electronic time recording service may recognize that the respective body may be intending to record time to the automated electronic time recording service. Conversely, if a respective body identified in the time recording data stream does not satisfy the time recording pose criteria, the automated electronic time recording service may recognize that the respective body may not be intending to record time to the automated electronic time recording service—thus minimizing the processing of unintended time recording transactions (e.g., minimizing the recording of unintended punch transactions to the automated electronic time recording service).

As will be described in more detail below, in some embodiments, in response to determining that one or more bodies in the time recording data stream satisfy the time recording pose criteria, S220 may function to extract probative portions from the one or more generated images of the one or more bodies (e.g., extract the heads of the one or more bodies, the hands of the one or more bodies, and/or the like) and forward those extracted probative portions to time recording recognition models.

Body Location Detection

In a variant implementation, the computed X, Y, and/or Z coordinates for one or more body parts of a target body may be used, by S220, to determine a location of the target body within the time recording scene. In such embodiments, S220 may function to compare an X, Y, and/or Z location of a body part (e.g., foot) to known boundary (e.g., perimeter) coordinates of the time recording zones in the time recording scene. If S220 determines that the X, Y, and/or Z location of a body part exists within a respective time recording zone boundary, S220 may function to determine that the target body may be located within that respective time recording zone. For instance, in a non-limiting example, S220 may function to determine that a target body may be located within a first time recording zone if an X, Y, and/or Z location of a foot of the target body exists within the X, Y, and/or Z boundary of the first time recording zone. Conversely, S220 may function to determine that the target body may be located within a second time recording zone if the X, Y, and/or Z location of the foot of the target body exists within the X, Y, and/or Z boundary of the second time recording zone. In some portions of the disclosure, the determination related to a target body's location within the time recording scene may be referred to as a "location signal."

2.30 User Identity Recognition

S230, which includes detecting an identity of one or more bodies, may function to identify or detect an identity of the one or more bodies captured/detected in the time recording data stream. It shall be noted that if S220 detected that one or more bodies in the time recording data stream did not satisfy the time recording pose criteria, S230 may not function to detect an identity for those one or more bodies. Alternatively, it shall also be noted that if S220 detected that a plurality of bodies in the time recording data stream satisfied the time recording pose criteria, S230 may function to concurrently (or simultaneously) detect an identity for each of those plurality of bodies—as opposed to sequentially detected.

In one or more embodiments, S230 may function to implement a facial recognition model (or user-recognition model) to compute an identity of a target body. In such embodiments, the facial recognition model may function to receive an image of a head of the target body as input and derive an identity of the target body as output, such as a name associated with the target body, an identification number associated with the target body (as described in S210), contact information associated with the target body, and/or the like. The output of the facial recognition model in some portions of the disclosure may be referred to herein as an "identification signal" and/or an identification inference.

It shall be noted that in cases where the time recording data stream includes a plurality of bodies that satisfy the time recording pose criteria, S230 may function to instantiate a plurality of instances of the facial recognition model to concurrently compute an identity associated with the plurality of bodies.

The image of the head of the target body that may be provided to the facial recognition model may have been created based on or extracted from the image of the target body generated in S220. That is, in response to determining that the target body satisfied the time recording pose criteria, S230 may function to generate the image of the head of the target body by extracting pixels, from the generated image of the target body in S220, that correspond to the head of the target body.

Additionally, or alternatively, to the embodiment described above, the facial recognition model may function to receive an image of a head of the target body as input and produce a facial feature vector associated with the head of the target body as output. The facial feature vector may include one or more values corresponding to one or more facial features represented in the image of the head of the target body, such a computed value corresponding to the eyes of the target body, a computed value corresponding to the nose of the target body, a computed value corresponding to the ears of the target body, a computed value corresponding to the lips of the target body, a computed value corresponding to the chin of the target body, and/or the like. The facial feature vector computed for the target body may then be compared to a plurality of reference facial feature vectors that are digitally associated with a plurality of potential users of the automated electronic time recording service to determine an identity of the target body.

In some cases, the image of the head of the target body may not be of sufficient image quality or image resolution to allow the facial recognition model to accurately derive an identity of the target body. That is, the image of the head of the target body may have an insufficient number of pixels (e.g., less than a threshold number of pixels) to detect an identity of the target body. As a result, the facial recognition model may return an indication indicating a facial recognition matching failure (e.g., insufficient pixels in image, etc.) or an indication of no facial match based on the image of the head of the target body. When the facial recognition model returns such an indication, S230 may function to forgo executing the remaining steps of method 200 and transmit the time recording data stream identified in S220 (or at least a portion of the time recording data stream) to a predetermined entity to assess the time recording intent of the target body (e.g., administrator, human arbiter, etc.).

Conversely, in some embodiments, the facial recognition model may not be able to identify the target body even if the image of the head of the target body may be of sufficient quality. This may occur because a user associated with the target body has not been previously enrolled to the automatic electronic time recording system (as described in S210). Accordingly, in such cases, S230 may function to initiate a process to automatically enroll or automatically enroll—optionally with no additional user input—the user associated with the target body to the automatic time recording service in similar ways described in S210 based at least on the extracted image of the head of the target body.

It shall be noted that S230 may additionally, or alternatively, function to use other suitable biometric data including, but not limited to, voice biometric data, gait biometric data, and/or the like captured in the time recording data stream to an identify an identity of a target body (e.g., in analogous ways described above).

In a variant implementation, S230 may function to determine an identity of one or more target users within a time recording scene based on identifying and processing a computer-readable or computer-identifiable indicia positioned along a respective body (as extracted by S220). The computer-identifiable indicia may include any suitable indicia including, but not limited to, one or more characters (e.g., alphanumeric characters), an image (e.g., a drawing, cartoon character), readable code (e.g., QR code or the like), and the like. In a similar manner, as described herein, S230 may function to process the computer-identifiable indicia to identify an identity or identity account value of each of the one or more target users within the time recording scene.

2.40 Time Recording Gesture Recognition

S240, which includes detecting time recording gestures, may function to detect time recording gestures performed by the one or more bodies identified in the time recording data stream. In one or more embodiments, bodies in the time recording data stream may perform a time recording gesture to record (or indicate) a start of a new time recording activity to the automated electronic time recording service (e.g., started working, started lunch, started a break, and/or the like) and/or to record (or indicate) an end of an activity to the automated electronic time recording service (e.g., stopped working, finished lunch, finished the break, and/or the like). Additionally, or alternatively, bodies in the time recording data stream may perform non-explicit or general time recording gestures. As generally referred to herein, non-explicit or general time recording gestures may not indicate a specific time activity to which the time recording gesture corresponds, and thus requires the automated electronic time recording service or a time recording application in operable communication with the automated electronic time recording service (or system) to derive the associated time recording activity based on past time recording actions performed by that respective body.

In some embodiments, if S220 functioned to determine that a plurality of bodies detected in the time recording data stream satisfied the above-described time recording pose criteria, one or more functions of S240 may be performed, concurrently or contemporarily, for those plurality of bodies. Additionally, or alternatively, if S220 functioned to determine that one or more bodies detected in the time recording data stream did not satisfy the above-described time recording pose criteria, one or more functions of S240 may not be performed for those one or more bodies.

In one or more embodiments, S240 may function to implement a time recording gesture recognition algorithm to detect which time recording gesture a target body performed. In such embodiments, the time recording gesture recognition algorithm may function to receive an image of a hand of the target body as input (or an image of another body part) and provide a name of the corresponding performed time recording gesture as output. It shall be noted that the time recording gesture recognition algorithm or model may be able to detect single-part time recording gestures and/or multi-part time recording gestures, as will be described in more detail herein.

Additionally, or alternatively, to the embodiment described above, the time recording gesture recognition algorithm may function to receive an image of the hand of the target body as input and produce a hand pose estimation vector associated with the hand of the target body as output. The hand pose estimation vector may include one or more values that indicate the pose of the hand of the target body. The hand pose estimation vector computed for the target body may then be compared to a plurality of reference hand pose vectors digitally associated with a time recording code/action (e.g., clock-in, clock-out, etc.) to determine the time recording activity performed by the hand of the target body.

In some embodiments, the input provided to the time recording gesture recognition algorithm or model may correspond to the portion of the target body that satisfied the time recording pose criteria. For instance, in a non-limiting example, if the target body satisfied time recording pose criteria because a first (e.g., right) hand of the target body was located above one or more shoulders of the target body, S240 may function to provide an image of the first (e.g., right) hand of the target body to the time recording gesture recognition algorithm. Conversely, in a second non-limiting example, if the target body satisfied the time recording pose criteria because a second (e.g., left) hand of the target body was located above one or more shoulders of the target user, S240 may function to provide an image of the second (e.g., left) hand of the target body to the time recording gesture recognition algorithm.

The image provided to the time recording gesture recognition algorithm may have been extracted (or cropped) from the image generated for the target body in S220. That is, in response to determining that a target body satisfied the time recording pose criteria, S240 may function to generate the image of the hand of the target body by extracting pixels, from the generated image of the target body in S220, that correspond to the hand of the target body that caused the time recording pose criteria to be satisfied.

After providing the image of the hand of the target body as input to the time recording gesture recognition algorithm, the time recording gesture recognition algorithm may compute an identifier or the name of the performed time recording gesture (or a time recording code) as output. For instance, in a non-limiting example, if the image of the hand of the target body indicates a first hand pose (e.g., all the fingers of the hand are curled towards the palm of the hand), the time recording gesture recognition algorithm may compute that the image of the hand of the target body corresponds to a first time recording gesture or activity (e.g., clock-in gesture). Conversely, if the image of the hand of the target body indicates a second hand pose (e.g., all the fingers of the hand are extended away from the palm of the hand), the time recording gesture recognition algorithm may compute that the image of the hand of the target body corresponds to a second time recording gesture or activity (e.g., clock-out gesture). It should be understood that the image of the hand of the target body may correspond to a plurality of possible handshapes, and thus correspond to a plurality of possible distinct time recording gestures. It shall be recognized that the time recording gesture recognition algorithm may function to compute a time recording code, which may be one of a plurality of distinct time recording codes of the time recording system and/or service. In such embodiments, each of the plurality of distinct time recording codes may be mapped to or electronically associated with one distinct electronic time recording action of a plurality of distinct time recording actions (e.g., clock-in, clock-out, transfer, meal break, and/or the like).

Additionally, or alternatively, the time recording recognition algorithm may function to detect multi-part time recognition gestures. Multi-part time recognition gestures may be gestures that contain multiple parts or portions that must be performed in succession of each other within a threshold amount of time (e.g., 5, 10, 15, 20, 25, 30, 60, 90, and/or like seconds). For instance, in a non-limiting example, a first multi-part time recognition gesture may require that two distinct "closed" fist hand poses be detected within the threshold amount of time. Similarly, a second multi-part time recognition gesture may require that n-number of distinct hand poses be detected within the threshold amount of time.

Accordingly, in such embodiments, S240 may function to receive, from S220, images of the target body over different frames in the time recording data stream—preferably frames in the time recording data stream where the target user was satisfying the time recording pose criteria. In response to receiving the images of the target body, S240 may function to extract the hand of the target body that satisfied the time recording pose criteria from each of the plurality of images and generate a chronologically ordered "gesture sequence" image that includes the extracted hand from each of the of the plurality of images. This gesture sequence image may then be provided to the time recording gesture recognition algorithm to predict the time recording gesture or action performed by the target body.

In some cases, the image of the hand of the target body may not be of sufficient image quality or image resolution to allow the time recording gesture recognition algorithm to accurately detect which time recording gesture the target body performed. In such embodiments, the time recording gesture recognition algorithm may return an indication indicating a time recording gesture recognition failure (e.g., insufficient pixels in image, etc.). When the time recording gesture recognition algorithm returns such an indication, S240 may function to forgo executing the remaining steps of method 200 and transmit the time recording data stream identified in S220 (or at least a portion of the time recording data stream) to a predetermined entity (e.g., administrator, human arbiter, etc.) to assess the time recording intent of the target body.

Conversely, in some embodiments, the time recording gesture recognition model may not be able to identify the performed time recording gesture even if the image of the gesture-performing body part of the target body may be of sufficient quality or even if a calculated confidence or inference probability satisfies a gesture-recognition threshold (e.g., a minimum confidence or inference probability value). This may occur because the target body performed a non-explicit or general time recording gesture, as described previously. In such embodiments, the time recording gesture recognition algorithm may return an indication that the target body performed an implicit time recording gesture. In a variant implementation, S240 may function to route the image of the gesture-performing body part of the target body to a time recording review queue. In such variant implementation, if an identity of the target body may be known or discoverable, S240 may function to route the gesture-performing body part together with a target body user identifier to a review queue user interface for an enhanced review or assessment and a calculated disposal of the intended time recording action.

It shall be noted that the output of the time recording gesture recognition algorithm in some portions of the disclosure may be referred to herein as a "time recording gesture signal" and/or a "time recording action inference."

2.50 Time Recording

S250, which includes automated electronic time recording, may function to compute an intended time recording action for one or more target bodies. Additionally, or alternatively, S250 may function to transmit confirmation or verification time recording notifications to the users associated with the one or more target bodies. It shall be noted that, in embodiments where S220 detected that a plurality of bodies in the time recording data stream satisfied the time recording pose criteria, S250 may function to compute an intended time recording action for each of the plurality of bodies in parallel (as opposed to sequentially computing the intended time recording action for each of the plurality of bodies).

In some embodiments, S250 may function to determine an intended time recording action for a target body based on a corresponding user identification (e.g., employee identifier) signal computed for the target body, a corresponding time recording gesture signal computed for the target body, and/or a corresponding location signal computed for the target body. That is, for a first target body, S250 may function to compute or derive the intended time recording action corresponding to the first target body based on the identification signal computed for the first target body, a time recording gesture signal computed for the first target body, and/or a location signal computed for the first target body. Conversely, for a second target body, S250 may function to compute the intended time recording action corresponding to the second target body based on an identification signal computed for the second target body, a time recording gesture signal computed for the second target body, and/or a location signal computed for the second target body (e.g., different signals as compared to the signals used to compute the intended time recording action of the first target body).

In one or more embodiments, computing or deriving the time recording action may include receiving a distinct time recording signal in association with a unique user account or user identifier value (signal). In such embodiments, if the time recording signal comprises a time recording code or the like, S250 may function to perform a time recording action lookup or search using the code. In one example, the method 200 may implement and/or access one or more data structures, such as code lookup tables, that S250 may function to access via a lookup or search with a given time recording code to identify an appropriation time recording action or time recording entry.

In some embodiments, the time recording activity performed by the target body may be registered as an entry into a time recording database of the automated electronic time recording service (or registered as an entry into a time recording database communicatively coupled with the automated electronic time recording service). To register the time recording activity performed by the target body as an entry into the time recording database, electronic ledger, or electronic journal, the entry may require one or more of the following to be specified: (1) an ID associated with the target body that performed the time recording activity, (2) the job task associated with the time recording activity, (3) the time recording activity type corresponding to the time recording activity, and/or (4) a time stamp (e.g., a date/time of time recording activity) and in some embodiments, a time stamp location identifier (e.g., timeclock identifier). Additionally, or alternatively, the time recording entry may be posted or recorded to an account associated with a distinct user or employee user. In such embodiments, the account of the user may include one or more electronic media dedicated to the user account for recording time recording activities or entries.

S250 may additionally or alternatively function to store a copy of the image of time recording gesture and/or a copy of the image of the body segment used for identification in association with the time recording entry. In this way, a confirmation or validation (including electronic auditing) may be performed for each time recording entry to ensure a technical accuracy of the gesture recognition model and user identification recognition model.

In a preferred embodiment, the ID associated with the target body that is specified in the above-described entry may correspond to the User ID indicated in the identification signal computed for the target body (as described in S230). This is, if the identification signal computed for the target body indicates a first User ID, the User ID specified in the above-described database entry may be the first User ID. Conversely, if the identification signal computed for the target body indicates a second User ID, the User ID specified in the above-described database entry may be the second User ID.

Additionally, or alternatively, in a preferred embodiment, the job task that is specified in the above-described entry may be based on the location signal computed for the target body. The location signal, as previously described in S220, may indicate the time recording zone in which the target body may be located. Accordingly, if the location signal computed for the target body indicates that the target body is located within a first time recording zone, the job task specified in the above-described database entry may be the job task that corresponds to the first time recording zone (e.g., a first job task). Conversely, if the location signal computed for the target body indicates that the target body is located within a second time recording zone, the job task specified in the above-described database entry may be the job task that corresponds to the second time recording zone (e.g., a second job task). It shall be noted that, in some embodiments, a job task does not need to be provided in order to record a time recording activity to the time recording database.

Additionally, or alternatively, in a preferred embodiment, the time recording activity type that is specified in the above-described entry may be based on the time recording gesture signal computed for the target body. The time recording gesture signal, as previously described in S240, may indicate the time recording gesture performed by the target body. Accordingly, if the time recording gesture signal computed for the target body indicates that the target body performed a first time recording gesture, the time recording activity type specified in the above-described database entry may be the time recording activity type that corresponds to the first time recording gesture (e.g., clock-in if the first time recording gesture corresponds to a clock-in gesture). Conversely, if the time recording gesture signal computed for the target body indicates that the target body performed a second time recording gesture, the time recording activity type specified in the above-described database entry may be the time recording activity type that corresponds to the second time recording gesture (e.g., clock-out if the second time recording gesture corresponds to a clock-out gesture). It shall be noted that S250 may function to (e.g., concurrently) register, to the time recording database, time recording activities of other users in the time recording data stream in similar ways described above.

In some embodiments, a time recording state (e.g., punch state) of the user account associated with the target body may be modified/updated in response to S250 registering a new time recording activity for the target body to time recording database. For instance, before the above-described time recording activity was registered to the time recording database, the user account associated with the target body may have been in a first time recording state (e.g., clocked-in state), and after registering the above-described time recording activity to the time recording database, the time recording state of the user account associated with the target body may have been updated from the first time recording state (e.g., clocked-in state) to a second time recording state (e.g., clocked-out state).

Additionally, in some embodiments, in response to registering a time recording activity performed by a target body to a time recording database, S250 may function to display, via a display generation component of the automated-electronic time recording service, a notification (or indication) that indicates the time recording activity performed by the target body was successfully registered to the time recording database and/or that indicates information relating to the time recording activity. Additionally, or alternatively, in some embodiments, S250 may function to transmit, to an electronic device associated with the user account that corresponds to the target body, a notification (or indication) that indicates the time recording activity performed by the target body was successfully registered to the time recording database and/or that indicates information relating to the time recording activity.

In some embodiments, if an incorrect time recording activity was registered to the time recording database (e.g., the time recording activity computed by S250 differed from the intended time recording activity of the target body), an administrator (or another entity) of the automated electronic time recording service may update the entry in the time recording database corresponding to the time recording activity to reflect the time recording activity intended by the target body and/or trigger model retraining to minimize the automated electronic time recording service from repeating the same computation error in the future (e.g., trigger retraining of the one or more models/algorithms described above).

3. Computer-Implemented Method and Computer Program Product

The system and methods of the preferred embodiment and variations thereof can be embodied and/or implemented at least in part as a machine configured to receive a computer-readable medium storing computer-readable instructions. The instructions are preferably executed by computer-executable components preferably integrated with the system and one or more portions of the processors and/or the controllers. The computer-readable medium can be stored on any suitable computer-readable media such as RAMs, ROMs, flash memory, EEPROMs, optical devices (CD or DVD), hard drives, floppy drives, or any suitable device. The computer-executable component is preferably a general or application specific processor, but any suitable dedicated hardware or hardware/firmware combination device can alternatively or additionally execute the instructions.

Although omitted for conciseness, the preferred embodiments include every combination and permutation of the implementations of the systems and methods described herein.

As a person skilled in the art will recognize from the previous detailed description and from the figures and claims, modifications and changes can be made to the preferred embodiments of the invention without departing from the scope of this invention defined in the following claims.

We claim:

1. A method for machine learning-based automated electronic time recording, the method comprising:
(1) identifying, via a scene capturing device, a representation of a time recording space;
(2) identifying, by one or more computers, a plurality of distinct bodies having a time recording pose within the time recording space based on an assessment of the representation of the time recording space, wherein:
(2-A) a target distinct body is determined to be in the time recording pose when a hand of the target distinct body is detected above a head of the target distinct body, and
(2-B) the target distinct body is determined not to be in the time recording pose when the hand of the target distinct body is detected below the head of the target distinct body;
(3) extracting a plurality of distinct features from the representation of the time recording space based on identifying the plurality of distinct bodies having the time recording pose, wherein extracting the plurality of distinct features includes:
(3-A) extracting a first distinct portion of a body for each of the plurality of distinct bodies within the representation of the time recording space; and
(3-B) extracting a second distinct portion of the body for each of the plurality of distinct bodies within the representation of the time recording space, wherein extracting the second distinct portion of the body for each of the plurality of distinct bodies includes extracting a hand segment that is causing each of the plurality of distinct bodies to be in the time recording pose;
(4) instantiating and executing a distinct automated employee-recognition for each of the plurality of distinct bodies based on extracting the first distinct portion of the body for each of the plurality of distinct bodies, wherein executing the distinct automated employee-recognition includes:
(4-A) generating, by an employee-identification machine learning model, an employee-identification inference for each of the plurality of distinct bodies based on a model input comprising extracted features of the first distinct portion of the body, wherein the employee-identification machine learning model comprises a convolutional neural network (CNN) that is trained based on one or more training corpora comprising a plurality of distinct portrait images of a plurality of distinct employees; and
(4-B) identifying, by the one or more computers, an employee identifier value for each of the plurality of distinct bodies based on the employee-identification inference;
(5) instantiating and executing a distinct automated time recording-recognition for each of the plurality of distinct bodies based on extracting the second distinct portion of the body for each of the plurality of distinct bodies, wherein executing the distinct automated time recording-recognition includes:
(5-A) generating, by a time recording machine learning model, a time recording action inference for each of the plurality of distinct bodies based on a model input comprising extracted features of the second portion of the distinct body, wherein:
(5-A-1) generating the time recording action inference for each of the plurality of distinct bodies includes predicting a hand gesture classification inference for each of the plurality of distinct bodies,
(5-A-2) the time recording action inference generated for a first distinct body of the plurality of distinct bodies indicates that the hand segment associated with the first distinct body corresponds to a first hand gesture, and
(5-A-3) the time recording action inference generated for a second distinct body of the plurality of distinct bodies indicates that the hand segment associated with the second distinct body corresponds to a second hand gesture, different from the first hand gesture; and
(5-B) identifying, by the one or more computers, a time recording code of a plurality of distinct time recording codes for each of the plurality of distinct bodies based on the time recording action inference, wherein:
(5-B-1) the one or more computers identified that the time recording code associated with the first distinct body corresponds to a clock-in time recording code based on the one or more computers identifying that the first hand gesture is digitally mapped to the clock-in time recording code; and
(5-B-2) the one or more computers identified that the time recording code associated with the second distinct body corresponds to a clock-out time recording code based on the one or more computers identifying that the second hand gesture is digitally mapped to the clock-out time recording code; and
(6) executing, via a time recording application executed by the one or more computers, a distinct automated electronic time recording event for each of the plurality of distinct bodies based on time recording inputs of (i) the employee identifier value and (ii) the time recording code associated with each of the plurality of distinct bodies within the representation of the time recording space, wherein:
(6-A) executing the distinct automated electronic time recording event for the first distinct body includes setting a first user account of the time recording application to a clocked-in time recording state, wherein the first user account is associated with the first distinct body; and
(6-B) executing the distinct automated electronic time recording event for the second distinct body includes setting a second user account of the time recording application to a clocked-out time recording state, wherein the second user account is associated with the second distinct body.

2. The method of claim 1, wherein the scene capturing device comprises an image capturing device configured to capture one or more representations of the time recording space.

3. The method of claim 1, wherein:
the distinct automated electronic time recording event executed for the first distinct body corresponds to a clock-in time recording event, and
the distinct automated electronic time recording event executed for the second distinct body corresponds to a clock-out time recording event,
the method further comprising:
after executing the clock-in time recording event for the first distinct body, visually indicating to the first distinct body that the clock-in time recording event was successfully registered to the time recording application; and after executing the clock-out time recording event for the second distinct body, visually indicating to the second distinct that the clock-out time recording event was successfully registered to the time recording application.

4. The method of claim 1, wherein:

extracting the first distinct portion of the body for each of the plurality of distinct bodies includes extracting at least a head segment or a facial segment from each of the plurality of distinct bodies.

5. The method of claim 1, wherein the time recording machine learning model comprises a second convolutional neural network (CNN) that is trained based on one or more second training corpora comprising a plurality of images of distinct hand-based time recording gestures.

6. The method of claim 1, wherein:

generating the employee-identification inference for each of the plurality of distinct bodies includes predicting a facial classification for each of the plurality of distinct bodies, the facial classification for each of the plurality of distinct bodies includes a distinct facial image value and an associated degree of confidence, and identifying the employee identifier value for each of the plurality of distinct bodies includes:
  performing a search, using the employee-identification inference generated for each of the plurality of distinct bodies, at a data structure comprising a plurality of distinct employee identifier values digitally associated with a plurality of employee-identification data;
  returning a distinct employee identifier value for each of the plurality of distinct bodies based on the search; and
  digitally linking each of the plurality of distinct bodies to a corresponding distinct employee identifier value.

7. The method of claim 1, further comprising:

implementing a time recording ensemble of machine learning models comprising:
  (1) the employee-identification machine learning model, and
  (2) the time recording machine learning model,
wherein the time recording ensemble of machine learning models output each of the employee-identification inference and the time recording action inference for each of the plurality of distinct bodies.

8. The method of claim 1, wherein:

the employee identifier value identified for each of the plurality of distinct bodies is associated with a distinct employee account accessible to the time recording application, before executing the distinct automated electronic recording event for each of the plurality of distinct bodies, the distinct employee account associated with each identified employee identifier value is in a first time recording state, and after executing the distinct automated electronic time recording event for each of the plurality of distinct bodies, the distinct employee account associated with each identified employee identifier value changes to a second time recording state, distinct from the first time recording state.

9. The method of claim 1, wherein:

the hand gesture classification inference generated for each of the plurality of distinct bodies includes a distinct gesture image value and an associated degree of confidence, and identifying the time recording code for each of the plurality of distinct bodies includes:
  performing a search, using the time recording action inference generated for each of the plurality of distinct bodies, at a data structure comprising a plurality of distinct gesture image values associated with the plurality of distinct time recording codes;
  returning a distinct time recording code for each of the plurality of distinct bodies based on the search; and
  digitally linking each of the plurality of distinct bodies to a corresponding time recording code.

10. The method of claim 1, wherein:

the first distinct body is in a still position when executing the distinct automated electronic time recording event for the first distinct body, and the second distinct body is moving through the time recording space when executing the distinct automated electronic time recording event for the second distinct body.

11. The method of claim 1, wherein:

the employee identifier value for each of the plurality of distinct bodies is identifiable when each of the plurality of distinct bodies have been enrolled into an automated electronic time recording system, and the employee identifier value for a subject distinct body is not identifiable when the subject distinct body has not previously enrolled into the automated electronic time recording system.

12. The method of claim 1, wherein the distinct automated employee-recognition and the distinct automated time recording-recognition are simultaneously instantiated and executed.

13. The method of claim 1, wherein:

a third distinct body of the plurality of distinct bodies comprises a first hand and a second hand, the third distinct body is determined to be in the time recording pose when a respective hand of the third distinct body is detected above a head of the third distinct body, and extracting the second distinct portion for the third distinct body includes:
  in accordance with a determination that the first hand of the third distinct body is detected above the head of the third distinct body, extracting the first hand of the third distinct body without extracting the second hand of the third distinct body; and
  in accordance with a determination that the second hand of the third distinct body is detected above the head of the third distinct body, extracting the second hand of the third distinct body without extracting the first hand of the third distinct body.

14. The method of claim 1, wherein the time recording space includes a plurality of time recording zones, the method further comprising:

identifying a location of each of the plurality of distinct bodies within the time recording space based on the assessment of the representation of the time recording space;

determining a time recording zone of the plurality of time recording zones associated with each of the plurality of distinct bodies based on the location of each of the plurality of distinct bodies, wherein executing the distinct automated electronic time recording event for each of the plurality of distinct bodies is based on inputs of (1) the employee identifier value associated with each of the plurality of distinct bodies, (2) the time recording code associated with each of the plurality of distinct bodies, and (3) the time recording zone associated with each of the plurality of distinct bodies.

15. The method of claim 1, further comprising:

after extracting the first distinct portion or the second distinct portion of the body of the first distinct body:
  identifying that the first distinct portion or the second distinct portion of the body for the first distinct body does not satisfy an image resolution threshold; and
  in response to identifying that the first distinct portion or the second distinct portion of the body for the first distinct body does not satisfy the image resolution threshold:
    forgoing instantiating and executing the distinct automated employee-recognition for the first distinct body;
    forgoing instantiating and executing the distinct automated time recording-recognition for the first distinct body;
    forgoing executing the distinct automated electronic time recording event for the first distinct body; and
    providing at least a portion of the representation of the time recording space to a predetermined entity to assess a time recording intent of the first distinct body.

16. A computer-program product embodied in a non-transitory machine-readable storage medium storing computer instructions that, when executed by one or more processors, perform operations comprising:
  (1) identifying, via a scene capturing device, a representation of a time recording space;
  (2) identifying, by the one or more processors, a plurality of distinct bodies having a time recording pose within the time recording space based on an assessment of the representation of the time recording space, wherein:
    (2-A) a target distinct body is determined to be in the time recording pose when a hand of the target distinct body is detected above a head of the target distinct body, and
    (2-B) the target distinct body is determined not to be in the time recording pose when the hand of the target distinct body is detected below the head of the target distinct body;
  (3) extracting a plurality of distinct features from the representation of the time recording space based on identifying the plurality of distinct bodies having the time recording pose, wherein extracting the plurality of distinct features includes:
    (3-A) extracting a first distinct portion of a body for each of the plurality of distinct bodies within the representation of the time recording space; and
    (3-B) extracting a second distinct portion of the body for each of the plurality of distinct bodies within the representation of the time recording space, wherein extracting the second distinct portion of the body for each of the plurality of distinct bodies includes extracting a hand segment that is causing each of the plurality of distinct bodies to be in the time recording pose;
  (4) instantiating and executing a distinct automated employee-recognition for each of the plurality of distinct bodies based on extracting the first distinct portion of the body for each of the plurality of distinct bodies, wherein executing the distinct automated employee-recognition includes:
    (4-A) generating, by an employee-identification machine learning model, an employee-identification inference for each of the plurality of distinct bodies based on a model input comprising extracted features of the first distinct portion of the body, wherein the employee-identification machine learning model comprises a convolutional neural network (CNN) that is trained based on one or more training corpora comprising a plurality of distinct portrait images of a plurality of distinct employees; and
    (4-B) identifying, by the one or more processors, an employee identifier value for each of the plurality of distinct bodies based on the employee-identification inference;
  (5) instantiating and executing a distinct automated time recording-recognition for each of the plurality of distinct bodies based on extracting the second distinct portion of the body for each of the plurality of distinct bodies, wherein executing the distinct automated time recording-recognition includes:
    (5-A) generating, by a time recording machine learning model, a time recording action inference for each of the plurality of distinct bodies based on a model input comprising extracted features of the second distinct portion of the body, wherein:
      (5-A-1) generating the time recording action inference for each of the plurality of distinct bodies includes predicting a hand gesture classification inference for each of the plurality of distinct bodies,
      (5-A-2) the time recording action inference generated for a first distinct body of the plurality of distinct bodies indicates that the hand segment associated with the first distinct body corresponds to a first hand gesture, and
      (5-A-3) the time recording action inference generated for a second distinct body of the plurality of distinct bodies indicates that the hand segment associated with the second distinct body corresponds to a second hand gesture, different from the first hand gesture; and
    (5-B) identifying, by the one or more processors, a time recording code of a plurality of distinct time recording codes for each of the plurality of distinct bodies based on the time recording action inference, wherein:
      (5-B-1) the one or more processors identified that the time recording code associated with the first distinct body corresponds to a clock-in time recording code based on the one or more processors identifying that the first hand gesture is digitally mapped to the clock-in time recording code; and
      (5-B-2) the one or more processors identified that the time recording code associated with the second distinct body corresponds to a clock-out time recording code based on the one or more processors identifying that the second hand gesture is digitally mapped to the clock-out time recording code; and
  (6) executing, via a time recording application executed by the one or more processors, a distinct automated electronic time recording event for each of the plurality of distinct bodies based on time recording inputs of (i) the employee identifier value and (ii) the time recording code associated with each of the plurality of distinct bodies within the representation of the time recording space, wherein:

(6-A) executing the distinct automated electronic time recording event for the first distinct body includes setting a first user account of the time recording application to a clocked-in time recording state, wherein the first user account is associated with the first distinct body; and (6-B) executing the distinct automated electronic time recording event for the second distinct body includes setting a second user account of the time recording application to a clocked-out time recording state, wherein the second user account is associated with the second distinct body.

* * * * *